United States Patent [19]

Ippen et al.

[11] Patent Number: 4,531,561
[45] Date of Patent: Jul. 30, 1985

[54] WOUND TIRE

[75] Inventors: Jakob Ippen, Leverkusen; Friedel Stüttgen, Pulheim, both of Fed. Rep. of Germany

[73] Assignee: Bayer Aktiengesellschaft, Fed. Rep. of Germany

[21] Appl. No.: 550,877

[22] Filed: Nov. 14, 1983

Related U.S. Application Data

[63] Continuation of Ser. No. 352,178, Feb. 25, 1982, abandoned, which is a continuation of Ser. No. 180,911, Aug. 25, 1980, abandoned.

[30] Foreign Application Priority Data

Aug. 29, 1979 [DE] Fed. Rep. of Germany ....... 2934936

[51] Int. Cl.³ ............................ B60C 9/14; B60C 9/20; B29H 17/08
[52] U.S. Cl. ..................................... 152/510; 156/123; 156/130; 156/133; 156/134; 152/532; 152/537; 152/544; 152/564; 152/DIG. 16
[58] Field of Search ..................... 156/110.1, 111, 123, 156/124, 133, 130, 134; 152/330 R, 354 R, 354 RB, 355, 357, 360, 361, DIG. 16

[56] References Cited

U.S. PATENT DOCUMENTS

| | | | |
|---|---|---|---|
| 2,541,550 | 2/1951 | Sarbach et al. | 152/357 |
| 2,587,470 | 2/1952 | Herzegh | 152/DIG. 16 |
| 3,130,769 | 4/1964 | Hindin et al. | 152/356 |
| 3,161,220 | 12/1964 | Beuladolph | 152/356 |
| 3,586,087 | 6/1971 | Messerly et al. | 152/330 R |
| 3,736,972 | 6/1973 | Petraschek et al. | 152/354 |
| 3,746,669 | 7/1973 | Dunnom et al. | 152/330 R |
| 4,019,551 | 4/1977 | Kolowski et al. | 152/DIG. 16 |

FOREIGN PATENT DOCUMENTS 53-4059 1/1978 Japan .

*Primary Examiner*—Lois E. Boland
*Attorney, Agent, or Firm*—Connolly and Hutz

[57] ABSTRACT

A tire consisting of an air-tight internal panel (1), carcass (2), wire cap (10), hump strip (9), belt (5), tread (6), shoulder portion (7), wire core (11) and lateral portion (8), whereby a combined prefabricated air-tight panel (1) with carcass fabric (2) in special rubber mixture encircles at least twice and on which is at least a double encircling coil (5) with textile treads crossing each other in more than three layers.

5 Claims, 6 Drawing Figures

WOUND TIRE

CROSS-REFERENCE TO RELATED APPLICATIONS

This application is a continuation of application Ser. No. 352,178 filed Feb. 25, 1982 (now abandoned) which in turn is a continuation of application Ser. No. 180,911, filed Aug. 25, 1980 (now abandoned).

The invention relates to a tire consisting of an airtight inner panel, a carcass, a wire cap, hump strips, a belt, a tread, a shoulder portion and a side portion.

The conventional vehicle tire is produced mainly by hand from very many differing components.

The quality of the tire depends, in particular, on the dexterity and care of the tire builder. These highly stressed vehicle components are consequently accompanied by an incalculable risk which is very serious since it endangers life and limb. Moreover, the manual work makes the labour costs very high.

The process cannot be automated economically due to the plurality of operating stages resulting from a plurality of differing components. In addition, the fitting of steel belts is very expensive and demands special care. Another feature of the steel belt is that the adhesion between rubber and metal decreases in proportion to the ageing of the tire. Problems are also caused by rust formation due to the friction between the steel threads moving against each other known as "fretting".

There has been no lack of attempts to mechanise the work. Thus, for example, a tire with encircling textile belts was experimentally produced and tested in conjunction with normal radial carcasses.

However, trials have shown that a tire of this type is poor in response and has unsatisfactorily lateral guidance. In particular, the tire failed during overtaking procedures as the driving behaviour was unstable.

An object of the invention is to find a tire for a vehicle with an associated apparatus which demands less operations but, nevertheless, meets higher requirements with respect to drive comfort, durability and drive stability.

According to the present invention there is provided a tire comprising an air-tight internal panel, a carcass, a wire cap, a hump strip, a belt, a tread, a shoulder portion, a wire core and a lateral portion, wherein the carcass and internal panel are formed by a carcass fabric embedded in a rubber mixture and an air-tight rubber panel extending over the entire length, which encircles the tire at least twice. The belt comprises two separate coils each with two turns. The coils have textile threads which cross over at a known angle to the direction of travel. Since the splice points of the two coils are situated opposite one another at least three layers are built-up using high modulus-possessing mixture to form the belt. At points other than the splice points four layers are present.

It is surprising to a skilled man that, in the case of a carcass which is coated over its entire length with an air-tight internal panel, the structure is not disturbed in the air-tight region even when greatly stressed under mechanical and thermal influences, despite the multiply encircling coil, as would be the case in the formerly used internal panel. Another advantage which should be mentioned is that the textile threads, which run obliquely to the direction of travel and winded up twice at least with right and left gradient, in conjunction with the mixture possessing a high modulus (i.e. tensile strength $\geq 6$ MPa at 100% elongation) impart to the tire all the driving properties which have to be met nowadays in the mass production of "tires".

The multiple coils with a web demand fewer operations and are easier to automate because of their more precise guidance. The number of starting points is also reduced thus producing fewer weak points, and this increases the safety of the tire. The textile threads are more economical and are lighter in weight than a conventional steel belt, this being advantageous in the case of rapidly rotating wheels.

In a particular embodiment, the beginning and end of the carcass fabric lie approximately on top of each other.

Shifting of the ends of the carcass fabric which in the circumferential direction should amount to between $-5$ and $+10$ mm relative to the fitting position of the joins on top of each other, does not have an undesirable effect on the properties of running true and strength. These possible tolerances considerably simplify the difficult production involving the plastic-elastic product.

In another embodiment, the rubber panel projects from at least 10 to 20 mm over the carcass layer in the axial direction.

In contrast to the conventional step-wise widening of the individual layers which only allows the winding of the layer, the carcass edges are surprisingly perfectly embedded if the internal panel projects, and sufficient protection from damage to these endangered points is thus achieved. See, for example, U.S. Pat. No. 3,130,769.

In another embodiment, the air-tight rubber panel has a density at 80° C. of from 22 to $42.10^{-8}1/24$ h m$^2$, preferably of from 30 $-35.10^{-8}1/24$ h m$^2$ (DIN 53536). According to German Industrial Standard DIN 535236, permeability is measured using a pressure of 10 bar and the rubber panel is 1.5 mm thick. The expression "1/24 h m$^2$" means the gas permeability which is measured by liter in 24 hours through a rubber layer of a size of 1 m$^2$.

Because of the doubled layer of the air-tight rubber panel, substantially fewer demands have to be met with respect to the tightness of the individual layer than in the case of the conventional single-layered internal panel, yet the safety of the tire with regard to air loss increases.

Suitable rubbers for the production of the air-tight mixture include natural and synthetic rubbers and mixtures thereof. Particularly suitable synthetic rubbers include styrene-butadiene rubber and butadiene rubber such as, for example, cis-1,4-polybutadiene.

The air-tight mixture is produced from conventional rubber mixtures which contain, in addition to the known vulcanising agents, accelerators and anti-agers, for example, the following constituents per 100 parts by weight of rubber: from 30–50 parts by weight carbon black, from 5 to 15 parts by weight of silica and from 0.5 to 4 parts by weight of an adhesive combination composed, for example, of resorcinol and stearic acid in a ratio of 2:1.

In a recommended embodiment, the belt consists of two separate coils each with two turns, the textile threads of each coil forming a specific angle to the direction of travel and to the other coil. As is well known in the art, such angle is usually in the range of 18° to 22° to the direction of travel.

The double ply windings per coil facilitate automatic operation. Since the splice points of the two coils are situated opposite one another a triple layer of cords is provided even at the splice points, thus making the tire very safe. At points other than the splice points, four layers of cords are present.

The reinforcement for the carcass can be produced from any desired rayon, polyamide, polyester, aramide or carbon fibre. Cords which only stretch slightly such as, for example, those of rayon, polyamide, glass, aramide or carbon fibres have to be used for the belt.

In a possible embodiment, the textile belt additionally contains two steel belt layers which are covered on one side or both sides with high modulus-possessing mixture. With heavy duty tires, the required properties of a heavy duty tire can be achieved by the incorporation of additional steel belt layers with layers of high modulus-prossessing mixture arranged above and below, the small number of steel belts making the tire cheaper and more economical.

In one embodiment, the tire has an air pressure of between 1 and 10 bar, preferably between 2 and 4 bar for passenger cars and between 7 and 10 bar for lorries.

The tire design according to the invention allows a high air pressure which leads to low rolling resistance and nevertheless has equally good spring comfort as corresponding steel belt tires due to the overall softer belt assembly.

In a preferred embodiment, the high modulus-possessing mixture contains from 20 to 40 parts by weight of reinforcing resin per 100 parts by weight of rubber.

Elastomers of this type are distinguished in that they have high degrees of hardness (Shore A hardness 85 to 95) and a tensile value having a tensile strength of from 6 to 15 MPa at 100% elongation. Moreover, they can readily be processed.

Suitable rubbers for the production of the high modulus-possessing mixture include natural and synthetic rubber and mixtures thereof. Particularly suitable synthetic rubbers include styrene butadiene rubber and butadiene rubber such as for example, cis-1,4-polybutadiene. Rubbers containing urethane or urea groups are also suitable.

The high modulus-possessing mixture is obtained from rubber mixtures containing, in addition to the conventional vulcanisers, accelerators, agers and fillers, from 20 to 40, preferably from 25 to 35 parts by weight of silica and from 20 to 40, preferably 25 to 35 parts by weight of reinforcing resin per 100 parts by weight of rubber. Suitable reinforcing resins include, for example, phenolic-based novolaks such as, for example, phenol-formaldehyde resing which can also be used in the form of their reaction products with boric acid, boron trioxide or boric acid alkyl ester as well as unsaturated fatty acids obtained according to German Offenlegungsschrift No. 2 557 613. Novolaks which are modified by conventional additives such as, for example, cashew oil are preferably used as reinforcing resins. It is also possible to use glass fibres instead of the reinforcing resin or in conjunction with it.

In an embodiment of the method, the individual operations are carried out on consecutively arranged units of a production machine, prefabricated layers of carcass with internal panel or belt with high modulus-possessing mixture automatically being supplied and wound for the coils in several layers.

Due to the passage, the materials can be supplied automatically into the individual units, thus saving manual work in this mass-produced article. At the same time, the application processes are reduced by the multiple coil, thus increasing the safety of production and shortening the production time.

Embodiments of the invention are illustrated in the accompanying drawings and described in more detail below.

Figure 1:
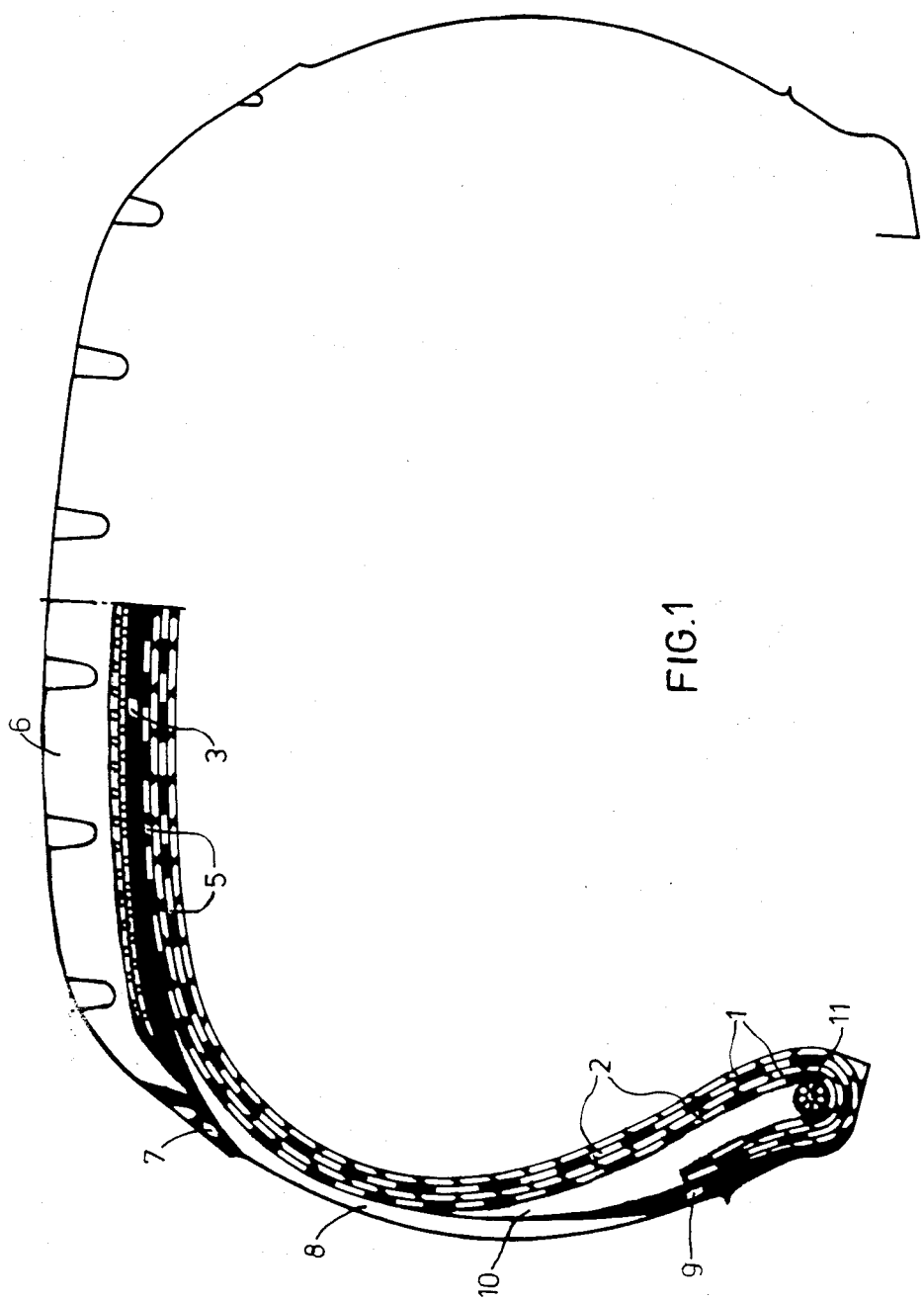
FIG. 1 is a cross sectional view through a portion of a passenger car tire illustrating one embodiment of this invention.

In FIG. 1, reference numeral 1 denotes an air-tight rubber panel, 2 a carcass, 3 a high modulus-possessing rubber mixture, 5 an encircling belt, 6 a tread, 7 a shoulder portion, 8 a lateral portion, 9 a hump strip, 10 a wire cap and 11 a steel cord core.

Figure 2:
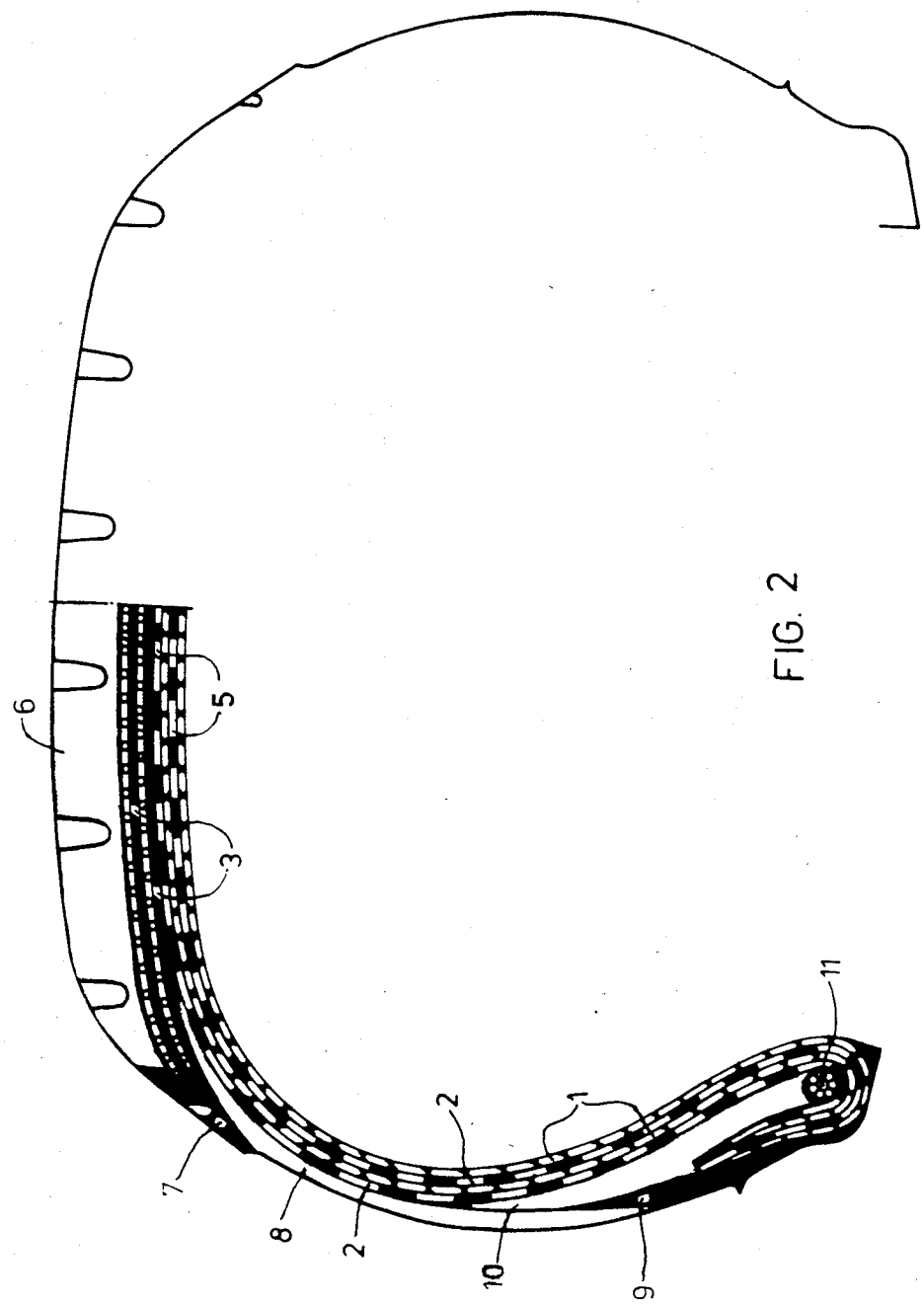
FIG. 2 is a cross sectional view through a portion of a passenger car tire illustrating another embodiment of this invention.

In FIG. 2, 1 denotes air-tight rubber panel, 2 carcass, 3 high modulus-possessing rubber mixture, 5 encircling belt, 6 tread, 7 shoulder portion, 8 lateral portion, 9 hump strip, 10 wire cap and 11 steel cord core.

Figure 3:
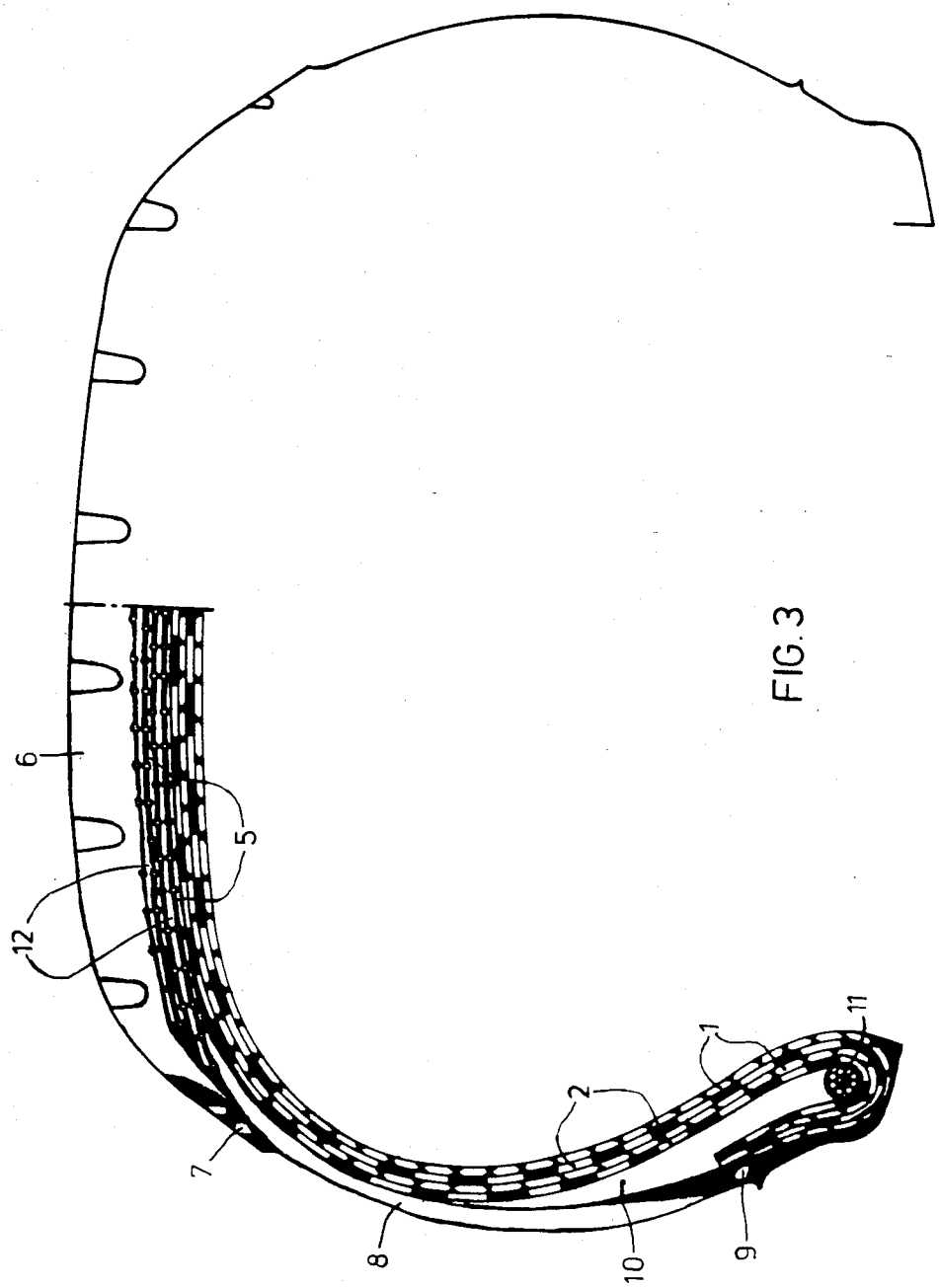
FIG. 3 is a cross sectional view through a portion of a passenger car tire illustrating still another embodiment of this invention.

In FIG. 3, 1 denotes air-tight rubber panel, 2 carcass, 5 wound belt with high modulus-possessing mixture and angle of inclination to the right, 12 wound belt with high modulus-possessing mixture and angle of inclination to the left, 6 tread, 7 shoulder portion, 8 lateral portion, 9 hump strip, 10 wire cap, 11 wire core.

Figure 4:
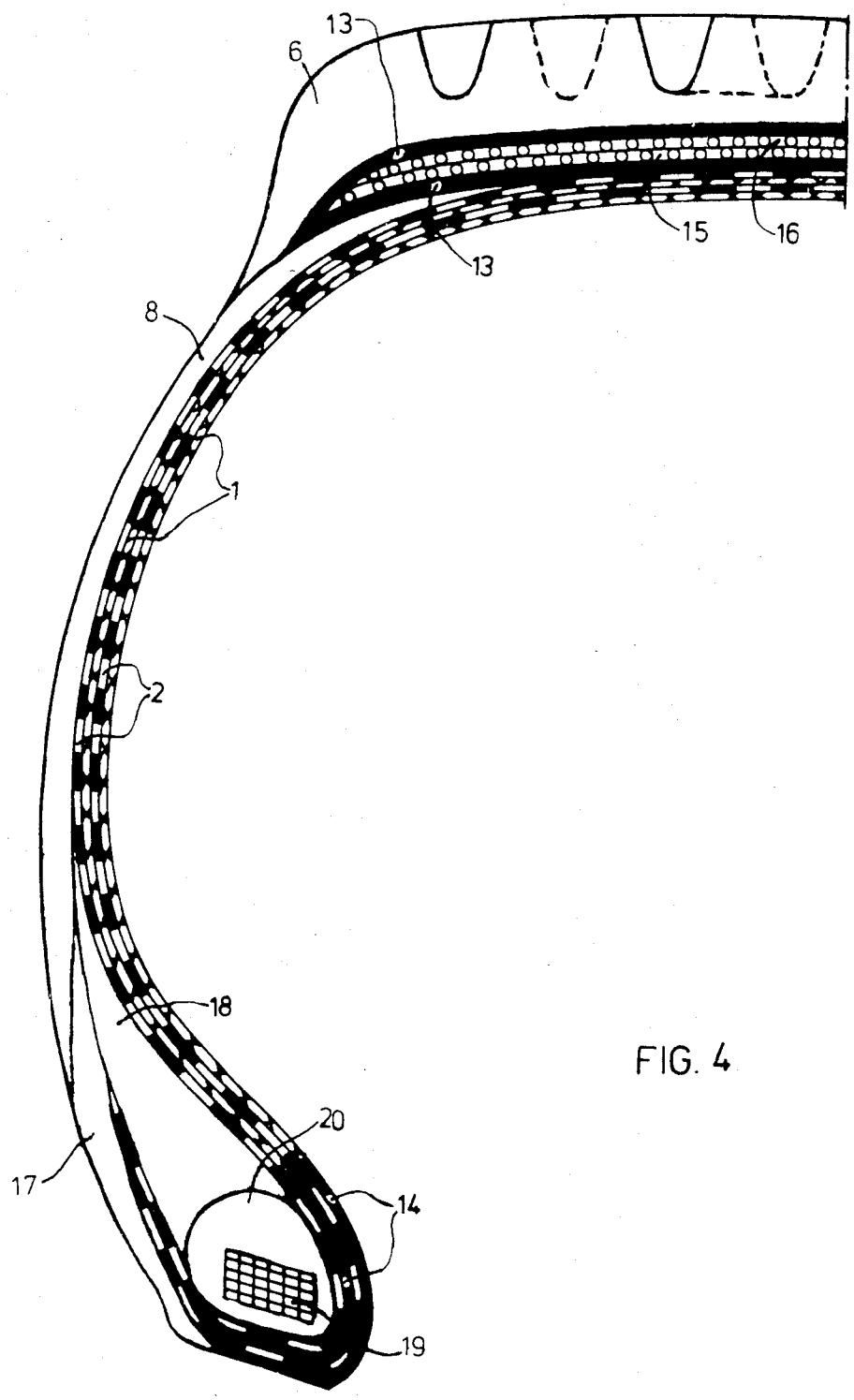
FIG. 4 is a cross sectional view through a portion of a lorry tire.

In FIG. 4, 1 denotes a rubber panel, 2 carcass, 13 high modulus-possessing mixture in the belt region, 14 high modulus-possessing mixture in the foot strip, 15 a steel belt with angle of inclination to the right, 16 a steel belt with angle of inclination to the left, 6 tread, 8 lateral portion, 17 a hump strip of high modulus-possessing mixture, 18 a wire cap of high modulus-possessing mixture, 19 a steel wire core, 20 a steel core sheath of high modulus-possessing mixture.

Figure 5:
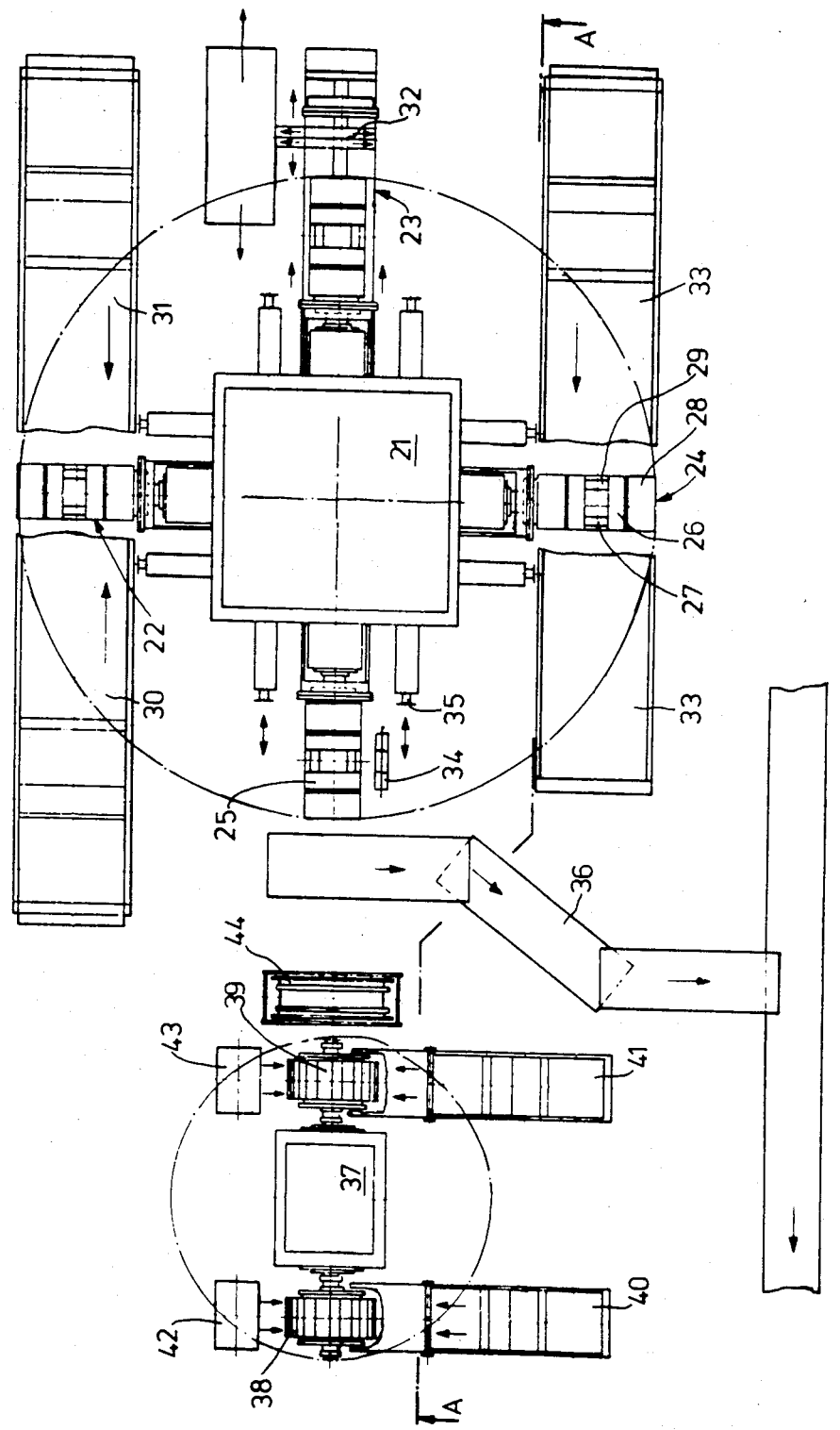
FIG. 5 is a top plan view looking in the direction of line B—B of FIG. 6 showing the production plant layout.
Figure 6:
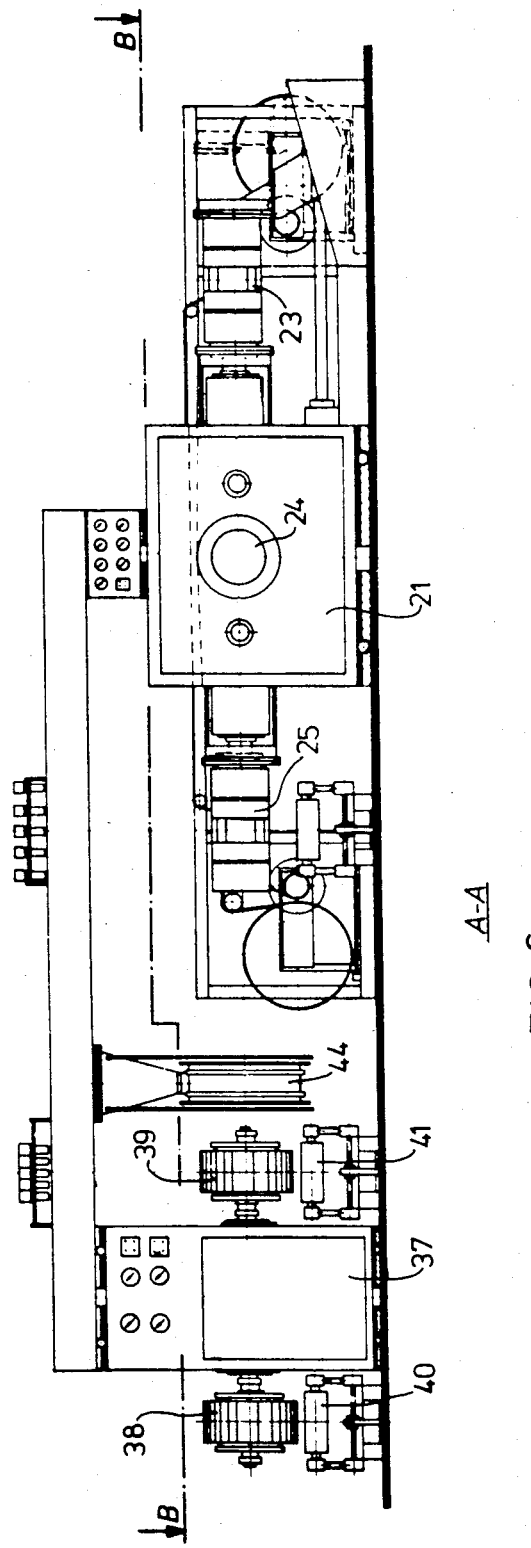
FIG. 6 is a side elevational view looking in the direction of line A—A of FIG. 5 showing the production plant layout of FIG. 5.

FIGS. 5 and 6 show a drive block 21 which is rotatable about a vertical axis and is provided with four units 22, 23, 24, 25 each consisting of a drivable construction drum 26 with vacuum openings 27 for applying the web, a folding skin 28 for fixing the wire cores and elements 29 which can be moved in the radial direction by expansion skin for cambering purposes.

The first unit 22 is provided with a servicer 30 for a doubled carcass and a servicer 31 for the wire caps. The second unit 23 has a magnetic core inserting device 32 which can be driven via the drum. The third unit 24 is provided with a servicer 33 for the hump strip and lateral portions. The fourth unit has a contact roller 34, a stripper 35 and a conveyor belt 36 for the blank.

Beside it, another drive block 37 is erected which is rotatable about a vertical axis and has two units 38, 39, each of which is equipped with a belt servicer 40 and tread servicer 41 as well as contact rollers 42, 43.

The fourth unit 25 of the first drive block 21 and the second unit 39 of the second drive block 37 lie opposite each other and are joined together by means of a conveyor 44 for the transfer of the tire superstructure to the substructure.

To produce a tire, a casing which has been cut to length and which is provided with an air-tight coating over its entire length is supplied to the drum on unit 22 by means of the production device 30 and rolled. Wire caps are similarly deposited by means of servicer 31, cut to length and rolled. After travelling into the next unit 23, the wire core is automatically inserted by means of a magnetic core insertion device 32. The core is subsequently clamped and the ply turn-up effected. In the next operation, after travelling to unit 24, the hump strip and the lateral portion are supplied via servicer 33, cut to length and rolled. The drum then pivots into position 25 in order to receive the belt later on.

In parallel with the previous operations, the belt layer, including the high modulus-containing mixture, is supplied to the drum via serivicer 40, cut to length and rolled in unit 38. The drum then pivots to unit 39 where the tread and the shoulder portion are supplied via servicer 41 deposited and rolled.

The conveyor 44 takes up the component from unit 39 and conveys it to unit 25 above the carcass. The carcass is cambered until contact is established with the belt. The blank tire is rolled by means of rollers 34 and ejected onto the conveyor belt 36 by means of the tire stripper 35.

EXAMPLE

Conventional mixtures can be used for the tire in addition to the formulations mentioned below by way of example.

|  | parts by weight |
| --- | --- |
| Natural rubber | 80.0 |
| cis-1,4-polybutadiene | 20.0 |
| Carbon black N-539 | 40.0 |
| active precipitated silica | 8.0 |
| zinc oxide | 10.0 |
| aromatic mineral oil | 3.0 |
| alkylphenol resin | 2.0 |
| N—isopropyl-N—phenyl-p-phenylene-diamine | 1.8 |
| 2,2,4-trimethyl-1,2-dihydro-quinoline | 1.2 |
| stearic acid | 0.75 |
| resorcinol/stearic acid 2:1 | 1.2 |
| hexamethylenetetraamine | 0.75 |
| benzothiazyl-2-cyclohexylsulphene amide | 0.7 |
| dibenzothiazyldisulphide | 0.3 |
| sulphur batch (53.2%) | 6.25 |
|  | 175.95 |
| Mixture plasticity/80° C. | 475/14 |
| Defo hardness/Defo elasticity |  |
| tensile strength (MPa) | 20.3 |
| breaking elongation (%) | 460 |
| tensile value at 300% elongation (MPa) | 11.7 |
| Tear propagation resistance according to Pohle (N) | 250 |
| hardness at 20/70° C. (Shore A) | 60/60 |
| impact elasticity at 20/70° C. | 64/70 |
| gas permeability at 80° C. | $32.2 \cdot 10^{-8}$ |

The high modulus-possessing mixture is produced from

|  | parts by weight |
| --- | --- |
| Natural rubber | 75.0 |
| cis-1,4-polybutadiene | 25.0 |
| carbon black N-347 | 40.0 |
| active precipitated silica | 30.0 |
| modified novolak | 30.0 |
| stearic acid | 3.0 |
| N—isopropyl-N—phenyl-p-phenylenediamine | 2.5 |
| 2,2,4-trimethyl-1,2-dihydroquinoline | 1.5 |
| zinc oxide | 5.0 |
| secondary amine | 2.5 |
| hexamethylenetetraamine (80%) | 4.5 |
| benzothiazyl-2-cyclohexylsulphene amide | 1.5 |
| sulphur batch (53.2%) | 7.5 |
|  | 227.5 |
| Mixture plasticity/80% | 2250/11 |
| Defo hardness/Defo elasticity |  |
| tensile strength (MPa) | 14.1 |
| breaking elongation (%) | 270 |
| tensile value at 100% elongation (MPa) | 6.5 |
| tear propagation resistance according to Pohle (N) | 180 |
| hardness at 20° C. (Shore A) | 89 |

We claim:

1. A tire comprising a carcass fabric embedded in a rubber mixture with an airtight rubber panel extending over the entire length thereof, the carcass fabric embedded in the rubber mixture and the airtight rubber panel encircling the tire at least twice to thereby form a double encircling coil, the airtight rubber panel projecting axially away from the carcass fabric by at least 10 to 20 mm., and the airtight rubber panel including rubber and the following constituents per 100 parts by weight of rubber: from 30 to 50 parts by weight carbon black, 5 to 15 parts by weight of silica, and 0.5 to 4 parts by weight of an adhesive combination.

2. A tire under construction as in claim 1 wherein at least part of the rubber of the airtight rubber panel is butadiene rubber.

3. A tire having (a) an outer belt comprising at least two separate coils each encircling the tire at least twice and each coil including two or more layers of rubber and textile threads, and (b) an inner carcass fabric embedded in a rubber mixture with an airtight rubber panel extending over the entire length thereof encircling the tire at least twice, the beginning and end of the carcass fabric lying approximately on top of each other, the airtight rubber panel projecting axially away from the carcass fabric by at least 10 to 20 mm., and the airtight rubber panel including rubber and the following constituents per 100 parts by weight of rubber: from 30 to 50 parts by weight carbon black, 5 to 15 parts by weight of silica, and 0.5 to 4 parts by weight of an adhesive combination.

4. A tire as in claim 3 wherein at least part of the rubber of the airtight rubber panel is butadiene rubber.

5. A tire as in claim 3 wherein the rubber of the belt includes 20 to 40% by weight resin for each 100 parts by weight of rubber.

* * * * *